United States Patent
Kim et al.

(10) Patent No.: US 9,508,982 B2
(45) Date of Patent: Nov. 29, 2016

(54) NEGATIVE ELECTRODE COMPOSITION FOR RECHARGEABLE LITHIUM BATTERY, NEGATIVE ELECTRODE COMPRISING SAME AND RECHARGEABLE LITHIUM BATTERY COMPRISING SAME

(71) Applicant: SAMSUNG SDI CO., LTD., Yongin-si, Gyeonggi-do (KR)

(72) Inventors: Young-Kee Kim, Yongin-si (KR); Jeong-Woo Han, Yongin-si (KR); Sun-il Park, Yongin-si (KR); Ishida Sumihito, Yongin-si (JP)

(73) Assignee: Samsung SDI Co., Ltd., Yongin-si (KR)

( * ) Notice: Subject to any disclaimer, the term of this patent is extended or adjusted under 35 U.S.C. 154(b) by 646 days.

(21) Appl. No.: 13/802,598

(22) Filed: Mar. 13, 2013

(65) Prior Publication Data
US 2013/0288118 A1 Oct. 31, 2013

(30) Foreign Application Priority Data

Apr. 30, 2012 (KR) ........................ 10-2012-0045834

(51) Int. Cl.
*H01M 4/133* (2010.01)
*H01M 4/587* (2010.01)
*H01M 10/0525* (2010.01)
*C01B 31/00* (2006.01)
*H01M 4/02* (2006.01)

(52) U.S. Cl.
CPC ............. *H01M 4/133* (2013.01); *H01M 4/587* (2013.01); *H01M 10/0525* (2013.01); *C01B 31/00* (2013.01); *H01M 2004/027* (2013.01); *Y02E 60/122* (2013.01)

(58) Field of Classification Search
CPC .... H01M 4/133; H01M 4/583; H01M 4/587; H01M 10/0525; H01M 2004/027
See application file for complete search history.

(56) References Cited

U.S. PATENT DOCUMENTS

| 6,090,506 | A  | * | 7/2000 | Inoue et al. ................... 429/232 |
| 7,115,221 | B1 | * | 10/2006 | Spahr et al. ..................... 264/15 |
| 2001/0007729 | A1 | * | 7/2001 | Kitoh et al. ................... 429/164 |
| 2004/0197656 | A1 | * | 10/2004 | Durkot et al. ................ 429/229 |
| 2010/0285359 | A1 | | 11/2010 | Hwang et al. |
| 2011/0159364 | A1 | * | 6/2011 | Nishinaka et al. ........... 429/217 |

(Continued)

FOREIGN PATENT DOCUMENTS

| CN | 1471191 A | 1/2004 |
| CN | 101916856 A | 12/2010 |

(Continued)

OTHER PUBLICATIONS

Timrex SFG6 Graphite technical datasheet, accessed online Aug. 17, 2015.*

(Continued)

*Primary Examiner* — Ula C Ruddock
*Assistant Examiner* — Lisa S Park
(74) *Attorney, Agent, or Firm* — Lewis Roca Rothgerber Christie LLP

(57) ABSTRACT

A negative electrode composition for a rechargeable lithium battery. The negative electrode includes a negative active material and crystalline carbon conductive material, wherein the negative active material includes soft carbon, and the crystalline carbon conductive material includes graphite having an average particle diameter (D90) of about 1 micrometer to about 20 micrometers.

20 Claims, 9 Drawing Sheets

(56) References Cited

U.S. PATENT DOCUMENTS

2011/0281180 A1 11/2011 Kim et al.
2012/0070745 A1 3/2012 Ishida et al.
2012/0321960 A1* 12/2012 Kim .................. H01M 4/133
429/231.8

FOREIGN PATENT DOCUMENTS

| CN | 102110847 A | 6/2011 |
| KR | 10-2004-0098847 | 11/2004 |
| KR | 10-0771840 B1 | 10/2007 |
| KR | 10-2008-0029480 A | 4/2008 |
| KR | 10-2010-0120919 | 11/2010 |
| KR | 10-1004443 B1 | 12/2010 |

OTHER PUBLICATIONS http://www.denka.com.sg/denka_black/, accessed Feb. 18, 2016.*
Extended European Search Report, dated Aug. 9, 2013 for European Patent Application No. 13165957.5, 6 pages.
SIPO Office action dated Apr. 1, 2016, for corresponding Chinese Patent application 201310145733.X, (7 pages).
KIPO Office action dated Mar. 16, 2016, for Korean priority Patent application 10-2012-0045834, (6 pages).
English machine translation of Chinese Publication 1471191 A dated Jan. 28, 2004, listed above, (15 pages).
English machine translation of Chinese Publication 101916856 A dated Dec. 15, 2015, listed above, (21 pages).

* cited by examiner

NEGATIVE ELECTRODE COMPOSITION FOR RECHARGEABLE LITHIUM BATTERY, NEGATIVE ELECTRODE COMPRISING SAME AND RECHARGEABLE LITHIUM BATTERY COMPRISING SAME

CROSS-REFERENCE TO RELATED APPLICATION

This application claims priority to and the benefit of Korean Patent Application No. 10-2012-0045834, filed in the Korean Intellectual Property Office on Apr. 30, 2012, the entire content of which is incorporated herein by reference.

BACKGROUND

1. Field

A negative electrode composition for a rechargeable lithium battery, a negative electrode for a rechargeable lithium battery including the same, and a rechargeable lithium battery including the negative electrode are disclosed.

2. Description of the Related Art

As diverse portable devices are being used due to advancement of information technology industry, various types of batteries are used as energy source for these portable devices. Since the development and demand for portable device technology increases, the demand for rechargeable batteries as energy source increases, and among the rechargeable batteries, a rechargeable lithium battery having high energy density and voltage is commercially available and widely used.

A rechargeable lithium battery utilizes intercalation-deintercalation reactions of lithium ions during charge and discharge. The rechargeable lithium battery includes a negative electrode including a negative active material being capable of intercalating and deintercalating lithium, a positive electrode including a positive active material being capable of intercalating and deintercalating lithium, a separator, and an electrolyte.

Also, researchers are studying a rechargeable battery that may be applied to an ISG (Integrated Starter & Generator) system that is used for the engine of a vehicle.

The ISG system is a system integrating a power generator and a motor. Specifically, the ISG system is an engine control system that stops the engine when the engine runs idle for a set or predetermined time, and then later when a brake pedal is released or when an accelerator pedal is stepped on, an Idle Stop and Go function for restarting the engine is performed.

Among the rechargeable batteries that may be applied to the ISG system is an AGM (Absorbed Glass Mat) battery, which has a relatively large volume compared with its capacity, but has the drawback of a short cycle-life due to repeated charge and discharge.

To overcome the problem, a rechargeable lithium battery having a small volume and large energy density is considered for ISG system. The rechargeable battery has to have high charge and discharge rate capability to be applied to the ISG system. Therefore, there is a need for a rechargeable lithium battery to have a low self-discharge rate as well as high charge and discharge rate capability.

SUMMARY

An aspect of an embodiment of the present invention is directed toward a negative electrode composition for a rechargeable lithium battery having excellent high input and output characteristics (charge and discharge rate capability), impedance characteristics, self-discharge characteristics, and cycle-life characteristics. Another aspect of an embodiment of the present invention is directed toward a negative electrode for a rechargeable lithium battery including the negative electrode composition. Still another aspect of an embodiment of the present invention is directed toward a rechargeable lithium battery including the negative electrode.

According to one embodiment of the present invention, provided is a negative electrode composition for a rechargeable lithium battery. The negative electrode composition includes a negative active material and a crystalline carbon conductive material, wherein the negative active material includes soft carbon, and the crystalline carbon conductive material includes graphite having an average particle diameter (D90) of about 1 micrometer to about 20 micrometers.

The crystalline carbon conductive material may be included in an amount of about 0.5 wt % to about 45.5 wt %, and specifically about 0.5 wt % to about 25 wt % based on the total amount of the negative electrode composition.

The crystalline carbon conductive material may be a highly anisometric flake material.

The crystalline carbon conductive material may have a Scott density of less than or equal to about 0.2 g/cm$^3$.

The crystalline carbon conductive material may have a specific surface area of about 5 to about 30 m$^2$/g.

The crystalline carbon conductive material may have a dibutylphthalate (DBP) absorption of about 100 to about 300 g/100 g.

The crystalline carbon conductive material may include ash in an amount of less than or equal to about 0.1 wt % based on the total amount of the crystalline carbon conductive material.

The crystalline carbon conductive material may further include denka black.

The crystalline carbon conductive material may have a (14700) peak at 2θ of about 26° in X-ray diffraction (XRD) analysis.

The negative electrode composition may further include a binder.

The binder may include one selected from carboxylmethylcellulose, hydroxyethylcellulose, hydroxypropylcellulose, hydroxypropylmethylcellulose, polyvinylidene fluoride, polytetrafluoroethylene, polyethylene, polypropylene, a styrene-butadiene rubber, a polybutadiene, a butyl rubber, a fluorine rubber, polyethyleneoxide, polyvinylalcohol, poly(metha)acrylic acid and a salt thereof, polyvinylpyrrolidone, polyepichlorohydrin, polyphosphazene, polyacrylonitrile, polystyrene, polyvinylpyridine, chlorosulfonated polyethylene, a latex, a polyester resin, an acrylic resin, a phenolic resin, an epoxy resin, a polymer of propylene and C2 to C8 olefin, a copolymer of (meth)acrylic acid and (meth)acrylic acid alkyl ester, and combinations thereof.

According to another embodiment of the present invention, a negative electrode for a rechargeable lithium battery is provided. The negative electrode includes a current collector and the negative electrode composition disposed on the current collector.

According to yet another embodiment of the present invention, a rechargeable lithium battery is provided. The rechargeable battery includes the negative electrode, a positive electrode including a positive active material, a separator interposed between the positive electrode and negative electrode, and electrolyte is provided.

The positive active material may include at least one selected from a lithium cobalt-based oxide, a lithium nickel cobalt manganese-based oxide, a lithium nickel cobalt aluminum-based oxide, and an olivine-based oxide.

The positive active material may further include activated carbon.

The activated carbon may be included in an amount of about 0.5 wt % to about 50 wt % based on the total amount of the positive active material.

The positive electrode may further include a conductive material.

The conductive material may include at least one selected from natural graphite, artificial graphite, carbon black, acetylene black, ketjen black, a carbon fiber, a carbon nanotube, a metal powder, a metal fiber, and a conductive polymer.

The rechargeable lithium battery may be configured as a battery for ISG (integrated starter generator).

In one embodiment, the negative electrode composition for a rechargeable lithium battery provides the rechargeable lithium battery with high input and output characteristics, and excellent impedance, self-discharge, and/or cycle-life characteristics.

DETAILED DESCRIPTION

Figure 1:
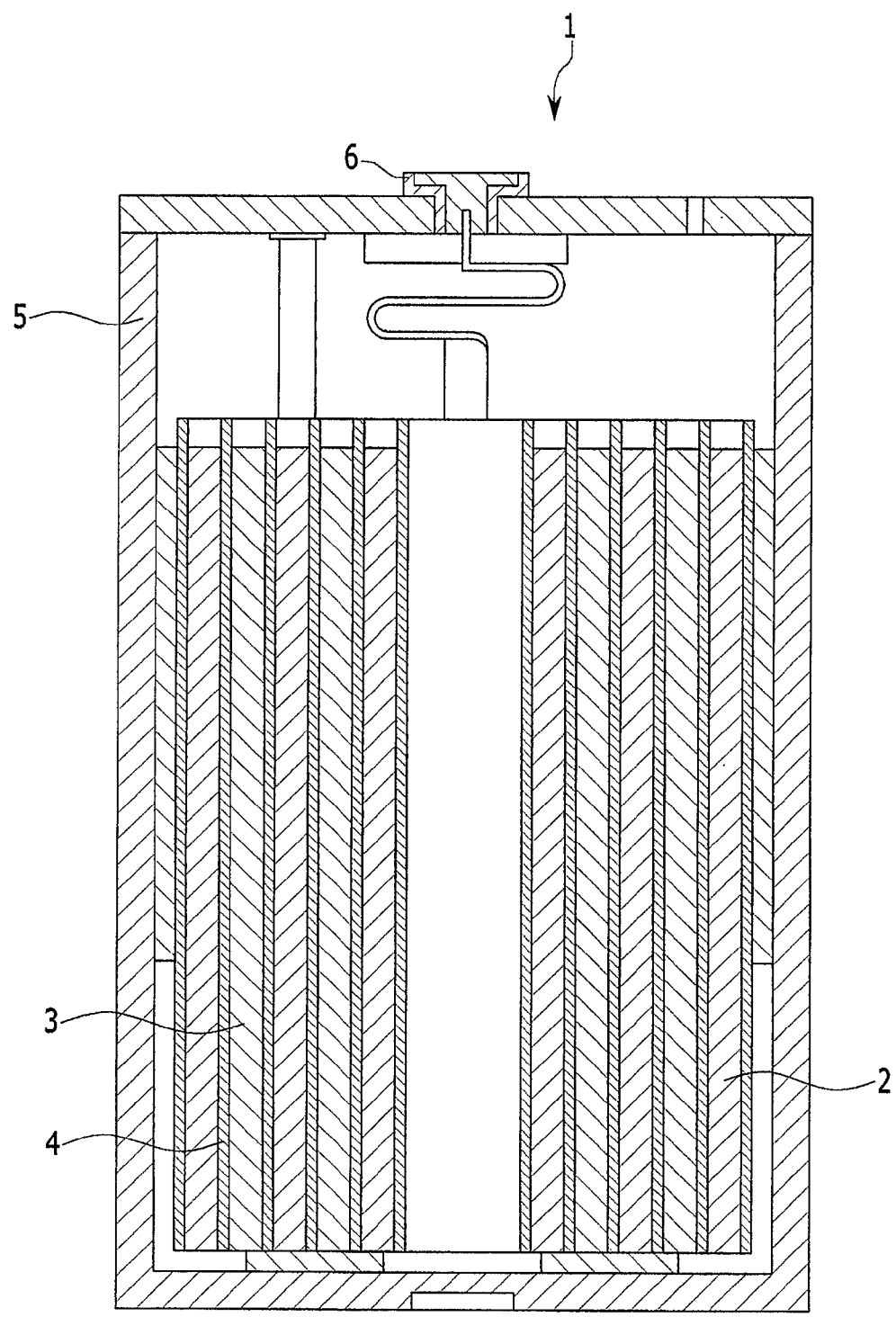
FIG. 1 is a schematic view of a rechargeable lithium battery according to one embodiment of the present invention.

Exemplary embodiments will hereinafter be described in more detail. However, these embodiments are exemplary, and this disclosure is not limited thereto.

One embodiment of the present invention provides a negative electrode composition for a rechargeable lithium battery that is applicable to ISG of automobiles due to high input and output characteristics and excellent self-discharge characteristics.

Specifically, the negative electrode composition includes a soft carbon material (e.g., soft carbon) as a negative active material, and a crystalline carbon conductive material as a conductive material.

The soft carbon is carbon formed by firing at a low temperature and is a low crystalline carbon material wherein its crystal structure may be converted into graphite.

The soft carbon may have a (7000) peak at 2θ of about 43°, a (5600) peak at 2θ of about 50°, a (550) peak at 2θ of about 54°, and a (1180) peak at 2θ of about 74° in X-ray diffraction (XRD) analysis.

The soft carbon may be included in an amount of about 54.5 to about 99.5 wt %, and specifically about 75 to about 99.5 wt % based on the total amount of the negative electrode composition. In one embodiment and when the soft carbon is included within the above ranges, excellent high input and output characteristics can be realized.

In one embodiment and when the negative electrode composition includes the crystalline carbon conductive material, self-discharge characteristics can be improved while maintaining excellent high input and output characteristics.

The crystalline carbon conductive material may include graphite having an average particle diameter (D90) of about 1 micrometer to about 20 micrometers, and specifically about 1 micrometer to about 10 micrometers. The average particle diameter (D90) denotes the average diameter of a particle corresponding to 90 volume % of accumulated volume in a particle distribution diagram. In one embodiment and when the average particle diameter (D90) range of the graphite is satisfied, excellent high input and output characteristics and self-discharge characteristics can be accomplished.

The crystalline carbon conductive material may be included in an amount of about 0.5 wt % to about 45.5 wt %, and specifically about 0.5 wt % to about 25 wt % based on the total amount of the negative electrode composition. In one embodiment and when the crystalline carbon conductive material is included within the above ranges, excellent high input and output characteristics and self-discharge characteristics can be accomplished.

The crystalline carbon conductive material may be a highly anisometric flake material (e.g., particles of the crystalline carbon conductive material may be highly anisometric flakes). In one embodiment and when the crystalline carbon conductive material has a shape of a highly anisometric flake, excellent high input and output characteristics and self-discharge characteristics can be accomplished.

The crystalline carbon conductive material may have a Scott density of less than or equal to about 0.2 g/cm$^3$, and particularly, about 0.01 g/cm$^3$ to about 0.2 g/cm$^3$. In one embodiment and within the Scott density ranges, excellent high input and output characteristics and self-discharge characteristics can be accomplished.

The crystalline carbon conductive material may have a specific surface area of about 5 to about 30 m$^2$/g, specifically about 5 to about 20 m$^2$/g, and more specifically about 10 to about 20 m$^2$/g. The specific surface area may be measured using a BET (Brunauer-Emmett-Teller). In one embodiment and within the specific surface area ranges, excellent high input and output characteristics and self-discharge characteristics can be accomplished.

The crystalline carbon conductive material may have a dibutylphthalate (DBP) absorption of about 100 to about 300 g/100 g, and specifically about 100 to about 200 g/100 g. In one embodiment and within the DBP absorption ranges, excellent high input and output characteristics and self-discharge characteristics can be accomplished.

The crystalline carbon conductive material may further include ash in an amount of less than or equal to about 0.1 wt % based on the total amount of the crystalline carbon conductive material. In one embodiment and when the ash is included within the above ranges, excellent high input and output characteristics and self-discharge characteristics can be accomplished.

The crystalline carbon conductive material may further include denka black. The denka black is a kind of carbon black and acetylene black prepared by pyrolysis of acetylene. Specifically, the crystalline carbon conductive material may further include denka black in an amount of about 0.5 wt % to about 45.5 wt %, and more specifically about 0.5 wt % to about 25 wt % based on the total amount of crystalline carbon conductive material.

The crystalline carbon conductive material may have a (14700) peak at 2θ of about 26° in X-ray diffraction (XRD) analysis. Specifically, the crystalline carbon conductive material may have a (14700) peak at 2θ of about 26°, a (7000) peak at 2θ of about 43°, a (5600) peak at 2θ of about 50°, a (550) peak at 2θ of about 54°, and a (1180) peak at 2θ of about 74°.

The negative electrode composition for a rechargeable lithium battery may further include a binder. The binder improves binding properties of the negative electrode composition for a rechargeable lithium battery with one another, and with a current collector. The binder may include, for example, one selected from carboxylmethylcellulose, hydroxyethylcellulose, hydroxypropylcellulose, hydroxypropylmethylcellulose, polyvinylidene fluoride, polytetrafluoroethylene, polyethylene, polypropylene, a styrene-butadiene rubber, a polybutadiene, a butyl rubber, a fluorine rubber, polyethyleneoxide, polyvinylalcohol, poly(metha)acrylic acid and a salt thereof, polyvinylpyrrolidone, polyepichlorohydrin, polyphosphazene, polyacrylonitrile, polystyrene, polyvinylpyridine, chlorosulfonated polyethylene, a latex, a polyester resin, an acrylic resin, a phenolic resin, an epoxy resin, a polymer of propylene and C2 to C8 olefin, a copolymer of (meth)acrylic acid and (meth)acrylic acid alkyl ester, and a combination thereof. However, the binder is not limited thereto.

In another embodiment of the present invention, a negative electrode for a rechargeable lithium battery, including a current collector and the negative electrode composition disposed on the current collector, is provided.

The current collector may include one selected from a copper foil, a nickel foil, a stainless steel foil, a titanium foil, a nickel foam, a copper foam, a polymer substrate coated with a conductive metal, and a combination thereof.

The negative electrode for a rechargeable lithium battery may be fabricated by a method including mixing soft carbon as a negative active material, a crystalline carbon conductive material as a conductive material, and a binder in a solvent to prepare a negative active material slurry, and coating the negative electrode slurry on a current collector. The electrode fabricating method is well known and thus, is not described in detail in the present specification. The solvent includes N-methylpyrrolidone, and the like, but is not limited thereto.

According to another embodiment of the present invention, a rechargeable lithium battery (including the negative electrode; a positive electrode including a positive active material; a separator interposed between the positive electrode and negative electrode; and an electrolyte) is provided.

The positive electrode includes a current collector and a positive active material layer disposed on the current collector.

In one embodiment of the present invention, the positive active material may include at least one selected from lithium cobalt-based oxide, lithium nickel cobalt manganese-based oxide, lithium nickel cobalt aluminum-based oxide, and olivine-based oxide.

The positive active material may be compounds represented by the following formulae:

$Li_aA_{1-b}R_bD_2$ (0.90≤a≤1.8 and 0≤b≤0.5); $Li_aE_{1-b}R_bO_{2-c}D_c$ (0.90≤a≤1.8, 0≤b≤0.5 and 0≤c≤0.05); $LiE_{2-b}R_bO_{4-c}D_c$ (0≤b≤0.5, 0≤c≤0.05); $Li_aNi_{1-b-c}Co_bR_cD_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cD_\alpha$ (0.90≤a≤1.8, 0≤b≤0.5, 0≤c≤0.05 and 0<α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2);

$Li_aNi_bE_cG_dO_2$ (0.90≤a≤1.8, 0≤b≤0.9, 0≤c≤0.5 and 0.001≤d≤0.1);

$Li_aNi_bCo_cMn_dGeO_2$ (0.90≤a≤1.8, 0≤b≤0.9, 0≤c≤0.5, 0≤d≤0.5 and 0.001≤e≤0.1);

$Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2);

$Li_{(3-f)}Fe_2(PO_4)_3$ (0≤f≤2); and $LiFePO_4$.

In the above formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of a coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

In one embodiment of the present invention, the positive active material may further include activated carbon as an additive. The activated carbon may be included in an amount of about 0.5 wt % to about 50 wt %, specifically about 0.5 to about 40 wt %, and more specifically about 0.5 to about 30 wt % based on the total amount of the positive active material. In one embodiment and when the activated carbon is included within the above amount ranges, charge and discharge characteristics can be improved without relative capacity decrease, and an electrolyte can be easily impregnated inside an electrode to make lithium ions transfer more actively.

In one embodiment of the present invention, the positive electrode includes a conductive material.

The conductive material improves electrical conductivity of the positive electrode. Any electrically conductive material can be used as a conductive agent, unless it causes a chemical change. Examples of the conductive material include natural graphite; artificial graphite; carbon black; acetylene black; ketjen black;

carbonfiber; carbonanotube; a metal powder of copper, nickel, aluminum, silver, and the like; a metal fiber of copper, nickel, aluminum, silver, and the like, a conductive polymer (such as a polyphenylene derivative, or the like); and a mixture thereof.

The positive active material layer may include a binder.

The binder improves binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The current collector may be Al, but is not limited thereto.

The positive electrode may be fabricated by a method including mixing a positive active material, a conductive material, and a binder in a solvent to prepare a positive active material slurry, and coating the positive active material slurry on a current collector. The electrode fabricating method is well known and thus, is not described in detail in the present specification. The solvent includes N-methylpyrrolidone, or the like, but is not limited thereto.

A separator may include any materials commonly used in the conventional lithium battery as long as it is for separating a negative electrode from a positive electrode and is for providing a transporting passage of lithium ion. In other words, it may have a low resistance to ion transport and an excellent impregnation for electrolyte. For example, it may be selected from glass fiber, polyester, TEFLON (tetrafluoroethylne), polyethylene, polypropylene, polytetrafluoroethylene (PTFE), and a combination thereof. It may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

The electrolyte may include a non-aqueous organic solvent and a lithium salt.

The non-aqueous organic solvent plays a role of transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethylcarbonate (DMC), diethylcarbonate (DEC), dipropylcarbonate (DPC), methylpropylcarbonate (MPC), ethylpropylcarbonate (EPC), ethylmethylcarbonate (EMC), ethylenecarbonate (EC), propylenecarbonate (PC), butylenecarbonate (BC), or the like. The ester-based solvent may include methylacetate, ethylacetate, n-propylacetate, 1,1-dimethylacetate, methylpropinonate, ethylpropinonate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent may include cyclohexanone, or the like. The alcohol-based solvent may include ethanol, isopropylalcohol, or the like. The aprotic solvent include nitriles such as R—CN (wherein R is a C2 to C20 linear, branched, or cyclic hydrocarbon, and may include one or more double bonds, one or more aromatic rings, or one or more ether bonds), amides such as dimethylformamide, dimethylacetamide, dioxolanes such as 1,3-dioxolane, sulfolanes, or the like.

The non-aqueous organic solvent may be used singularly or in a mixture. When the organic solvent is used in a mixture, its mixture ratio can be controlled in accordance with desirable performance of a battery.

The carbonate-based solvent may include a mixture of a cyclic carbonate and a linear carbonate. The cyclic carbonate and the linear carbonate are mixed together in a volume ratio of about 1:1 to about 1:9 as an electrolyte, the electrolyte may have enhanced performance.

The electrolyte of the present invention may be prepared by further adding the aromatic hydrocarbon-based solvent to the carbonate-based solvent. The carbonate-based solvent and the aromatic hydrocarbon-based solvent are mixed together in a volume ratio of about 1:1 to about 30:1.

The aromatic hydrocarbon-based organic solvent may be represented by the following Chemical Formula 1.

i)

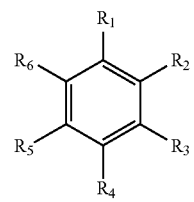

[Chemical Formula 1]

In Chemical Formula 1, $R_1$ to $R_6$ are each independently hydrogen, halogen, a C1 to C10 alkyl group, a C1 to C10 haloalkyl group, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further include vinylene carbonate or an ethylene carbonate-based compound represented by the following Chemical Formula 2 in order to improve cycle-life of a battery.

i)

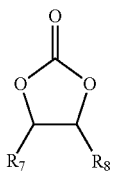

[Chemical Formula 2]

In Chemical Formula 2, $R_7$ and $R_8$ are each independently hydrogen, a halogen, a cyano group (CN), a nitro group ($NO_2$) or a C1 to C5 fluoroalkyl group, provided that at least one of $R_7$ and $R_8$ is a halogen, a cyano group (CN), a nitro group ($NO_2$) or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the vinylene carbonate or the ethylene carbonate-based compound for improving cycle life may be adjusted within an appropriate range.

The lithium salt is dissolved in the non-aqueous solvent and supplies lithium ions in a rechargeable lithium battery, and basically operates the rechargeable lithium battery and improves lithium ion transfer between positive and negative electrodes. The lithium salt includes at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate, LiBOB), and a combination thereof. The lithium salt may be used in a concentration of about 0.1 to about 2.0M. In one embodiment, when the lithium salt is included within the above concentration range, it provides desired (excellent) electrolyte performance and lithium ion mobility due to desired electrolyte conductivity and viscosity.

FIG. 1 is a schematic view of a rechargeable lithium battery according to one embodiment. Referring to FIG. 1, the rechargeable lithium battery 1 is a cylindrical battery that includes a negative electrode 2, a positive electrode 3, a separator 4 interposed between the negative electrode 2 and the positive electrode 114, an electrolyte impregnating the separator 4, a battery case 5, and a sealing member 6 sealing the battery case 5. The rechargeable lithium battery 1 is fabricated by sequentially laminating a negative electrode 2, a positive electrode 3, and a separator 4, spirally winding them, and housing the spiral-wound product in a battery case 5.

The following examples illustrate the present invention in more detail. These examples, however, should not in any sense be interpreted as limiting the scope of the present invention.

EXAMPLE 1

A negative active material slurry was prepared by dispersing soft carbon as a negative active material, graphite (Timcal Corporation, SFG6) as a conductive material, and polyvinylidene fluoride (PVDF) as a binder in N-methylpyrrolidone solvent at a weight ratio of 90:5:5. The physical properties of the graphite were as shown in the following Table 1. Subsequently, a negative electrode was fabricated by coating copper foil with the negative active material slurry, drying it and compressing it.

A positive active material slurry was prepared by mixing $LiCoO_2$ as a positive active material, polyvinylidene fluoride (PVDF) as a binder, acetylene black as a conductive material, and activated carbon as an additive at a weight ratio of 94:3:3, and dispersing them in N-methyl-2-pyrrolidone. A positive electrode was fabricated by coating an aluminum foil with the positive active material slurry, drying it, and compressing it.

An electrolyte solution was prepared by dissolving 1.15M $LiPF_6$ in a mixed solution of ethylenecarbonate (EC), ethylmethylcarbonate (EMC) and dimethylcarbonate (DMC) (3:4:3 volume ratio).

A pouch-type rechargeable lithium battery cell was fabricated by interposing a separator formed of a polyethylene material between the fabricated positive electrode and negative electrode, implanting the electrolyte solution thereto, and winding and compressing it.

TABLE 1

|  | Properties of graphite used in Examples 1 to 4 |
|---|---|
| D90 average particle diameter (μm) | 6.5 |
| shape of particle | Highly anisometric flakes |
| ash (wt %) | 0.07 |
| scott density (g/cm$^3$) | 0.07 |
| specific surface area (m$^2$/g) | 17 |
| DBP absorption (g/100 g) | 180 |

EXAMPLE 2

A rechargeable lithium battery cell was fabricated according to the same method as in Example 1, except that soft carbon, graphite, and PVDF were mixed at a weight ratio of 87:10:3.

EXAMPLE 3

A rechargeable lithium battery cell was fabricated according to the same method as in Example 1, except that soft carbon, graphite, and PVDF were mixed at a weight ratio of 82:15:3.

EXAMPLE 4

A rechargeable lithium battery cell was fabricated according to the same method as in Example 1, except that soft carbon, graphite, denka black, and PVDF were mixed at a weight ratio of 92:2.5:2.5:3. The denka black was a sort (kind) of carbon black, and was prepared by treating acetylene black through pyrolysis of acetylene.

COMPARATIVE EXAMPLE 1

A rechargeable lithium battery cell was fabricated according to the same method as in Example 1, except that soft carbon, denka black, and PVDF were mixed at a weight ratio of 92:5:3.

COMPARATIVE EXAMPLE 2

A rechargeable lithium battery cell was fabricated according to the same method as in Example 1, except that graphite having an average particle diameter (D90) of 25 μm was used as a conductive material.

Figure 2:
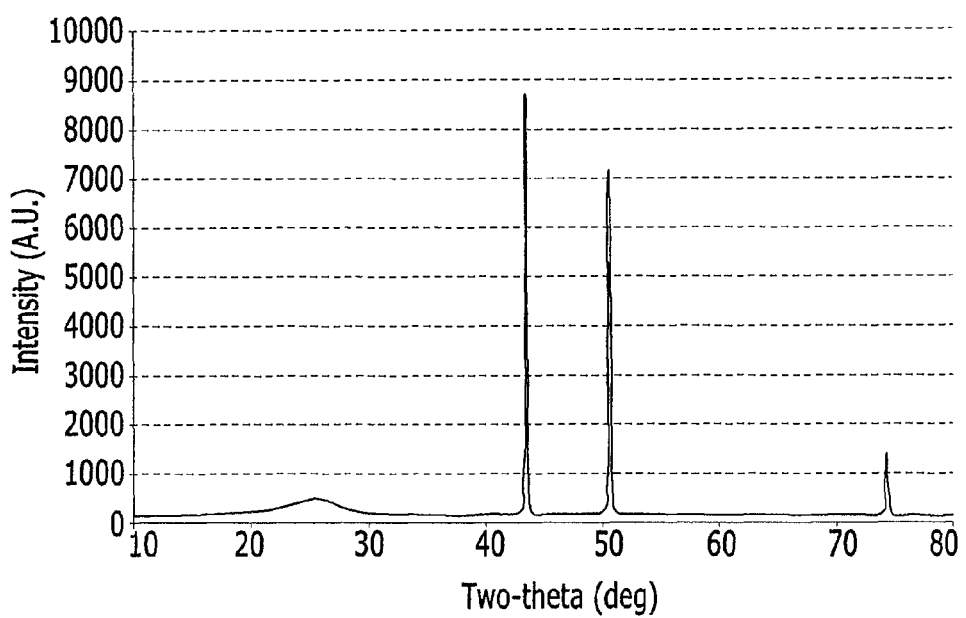
FIG. 2 shows an XRD (X-ray diffraction) pattern of the soft carbon used in Examples 1 to Example 4 and Comparative Examples 1 and 2.

FIG. 2 shows an XRD pattern of the soft carbon used in Examples 1 to Example 4 and Comparative Examples 1 and 2. Referring to FIG. 2, the soft carbon had a (500) peak at 2θ of about 25°; a (8700) peak at 2θ of about 43°; a (7100) peak at 2θ of about 50°; and a (1300) peak at 2θ of about 74° in XRD analysis.

Figure 3:
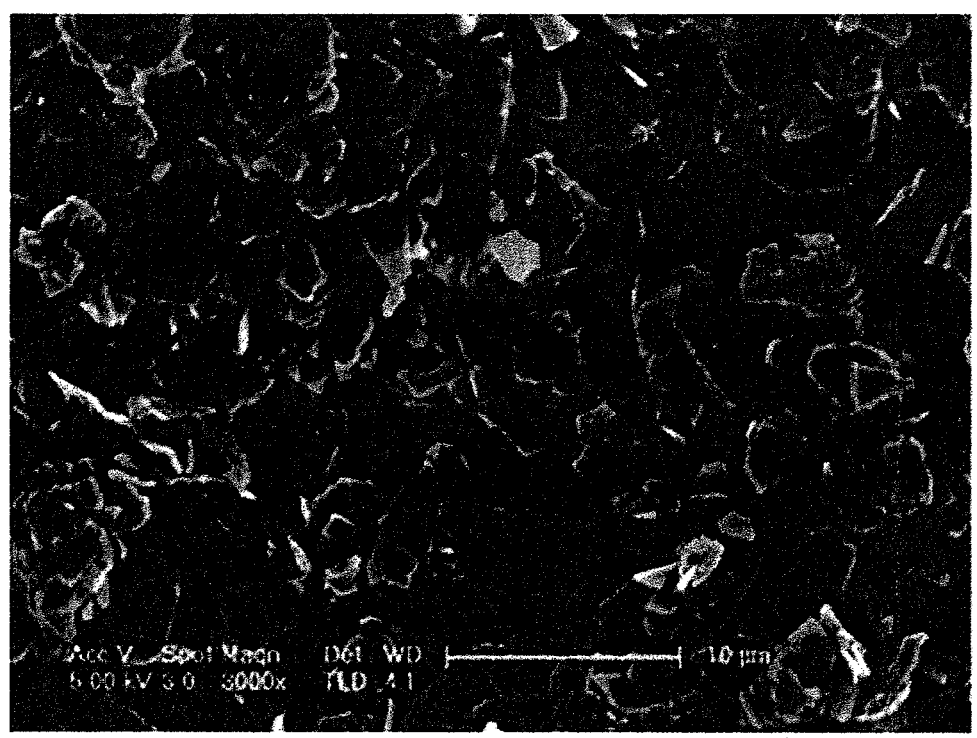
FIG. 3 is an SEM (scanning electron microscope) photograph of the crystalline carbon conductive material used in Examples 1 to 4.
Figure 4:
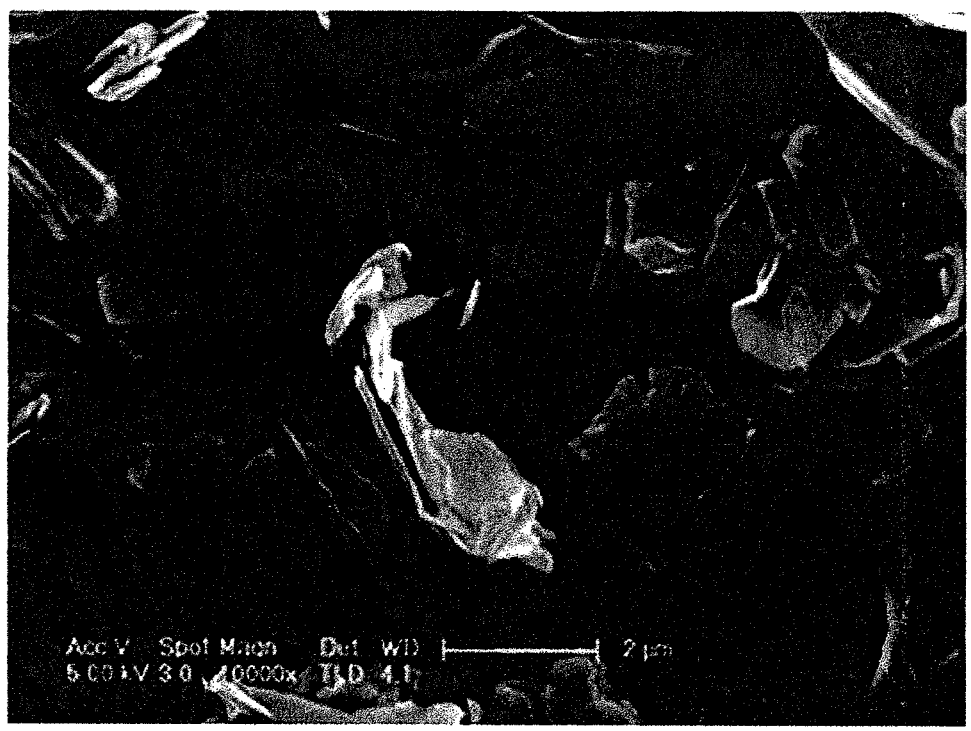
FIG. 4 is an enlarged SEM photograph of FIG. 3.

FIG. 3 is an SEM (scanning electron microscope) photograph of the crystalline carbon conductive material used in Examples 1 to 4. FIG. 4 is an enlarged SEM photograph of FIG. 3. As shown in FIGS. 3 and 4, the crystalline carbon conductive material used in Examples 1 to 4 had an average particle diameter of about 6.5 micrometers.

Figure 5:
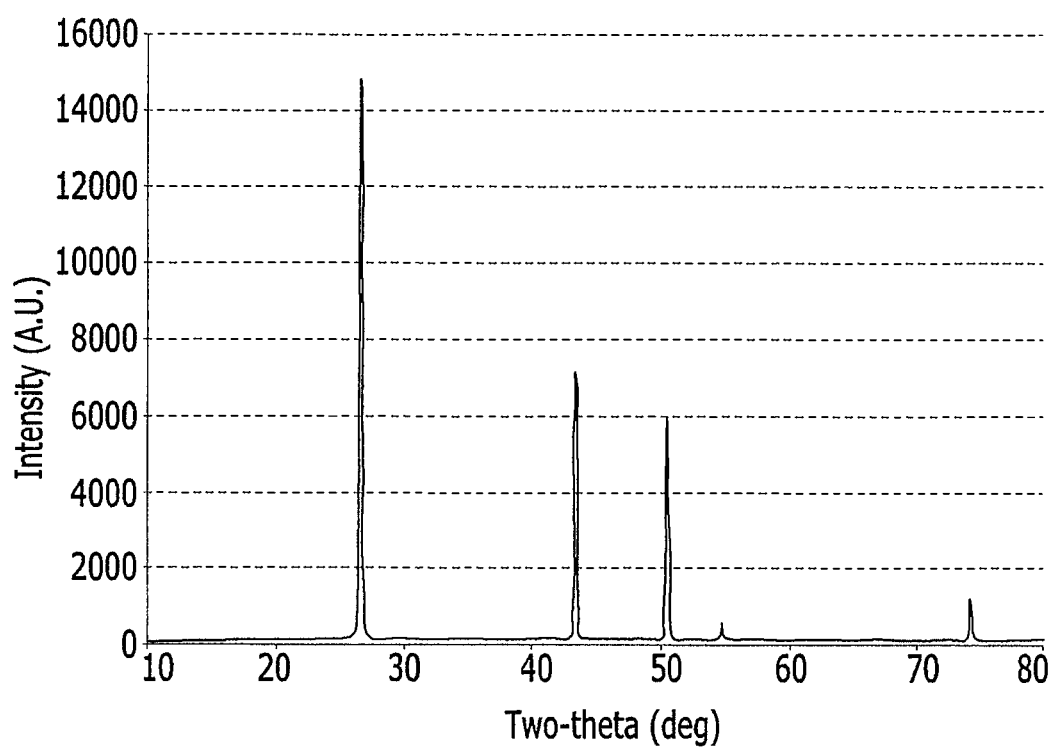
FIG. 5 shows an XRD pattern of the crystalline carbon conductive material used in Examples 1 to 4.

FIG. 5 shows an XRD pattern of the crystalline carbon conductive material used in Examples 1 to 4. As shown in FIG. 5, the crystalline carbon conductive material had (14700) peak at 2θ, 26°; (7000) peak at 2θ, 43°; (5600) peak at 2θ, 50°; (550) peak at 2θ, 54°; and (1180) peak at 2θ, 74° in XRD analysis.

Evaluation 1: High Input and Output Characteristics

Figure 6:
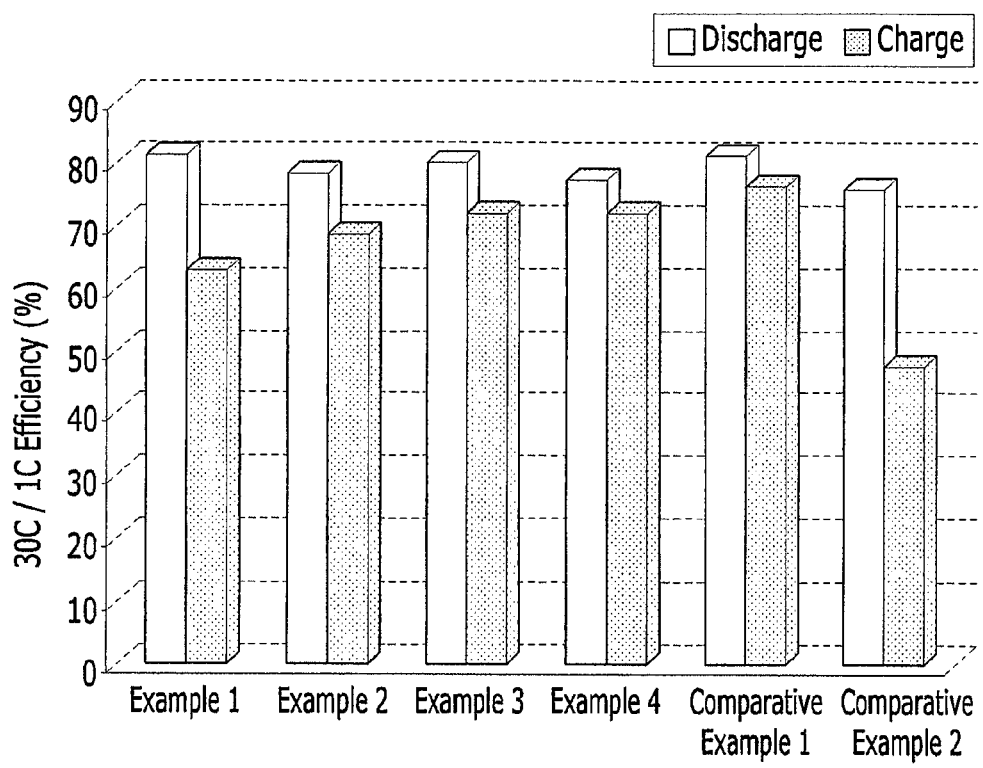
FIG. 6 is a graph showing high input and output characteristics of the rechargeable lithium battery cells according to Examples 1 to 4 and Comparative Examples 1 and 2.

FIG. 6 is a graph showing high input and output characteristics of the rechargeable lithium battery cells according to Examples 1 to 4 and Comparative Examples 1 and 2. The vertical axis of FIG. 6 denotes the percentage of the charge capacity at 30 C based on the charge capacity at 1 C, and the percentage of the discharge capacity at 30 C based on the discharge capacity at 1 C.

Referring to FIG. 6, in case of Examples 1 to 4, the charge capacity ratio was higher than or equal to about 63% and the discharge capacity was higher than or equal to about 77%. Therefore, it may be seen that the high input and output characteristics were excellent, just as in Comparative Example 1.

However, Comparative Example 2 whose charge capacity ratio was 48% and discharge capacity ratio was 75% had relatively inferior high input and output characteristics. It may be seen from the result that when the average particle diameter of the graphite goes out of the range of about 1 micrometer to about 20 micrometers, the high input and output characteristics were poor.

Evaluation 2: Impedance Characteristics

Figure 7:
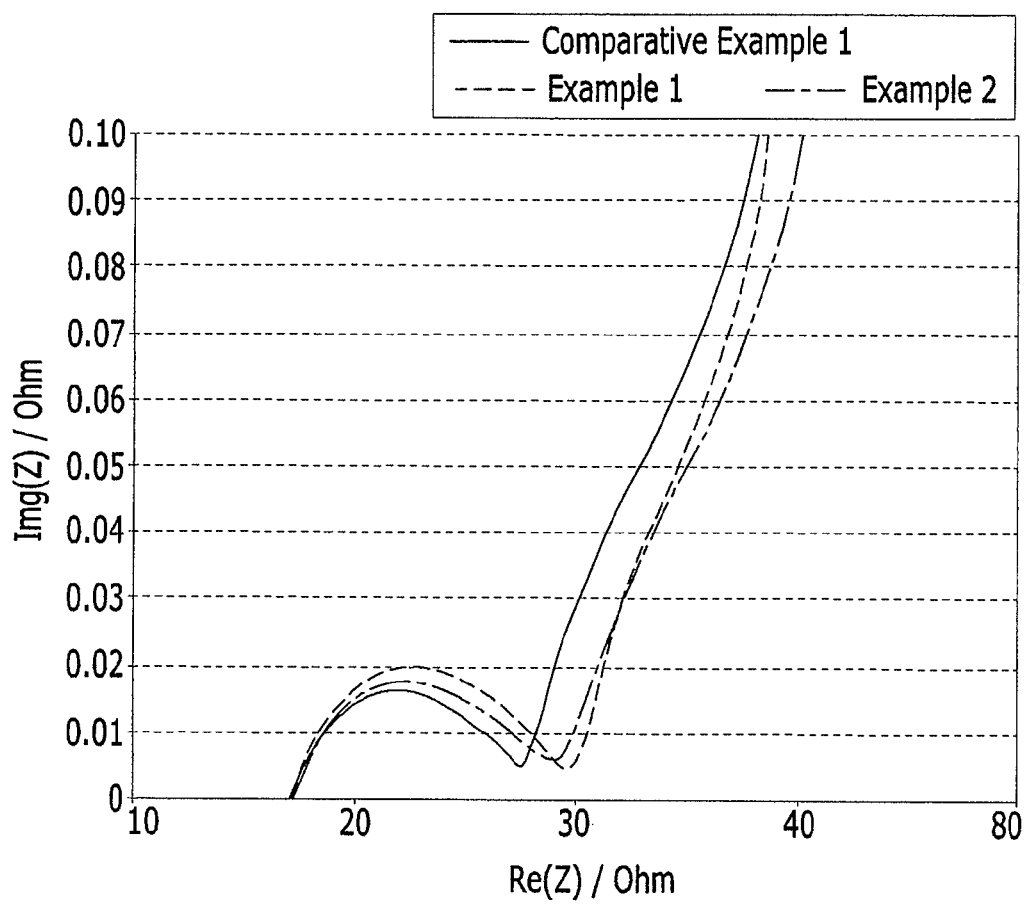
FIG. 7 is a graph showing impedance characteristics of the rechargeable lithium battery cells according to Examples 1 and 2 and Comparative Example 1.

FIG. 7 is a graph showing impedance characteristics of the rechargeable lithium battery cells according to Examples 1 and 2 and Comparative Example 1.

It may be seen from FIG. 7 that Examples 1 and 2 had excellent impedance characteristics just as Comparative Example 1.

Evaluation 3: Self-Discharge Characteristics

Figure 8:
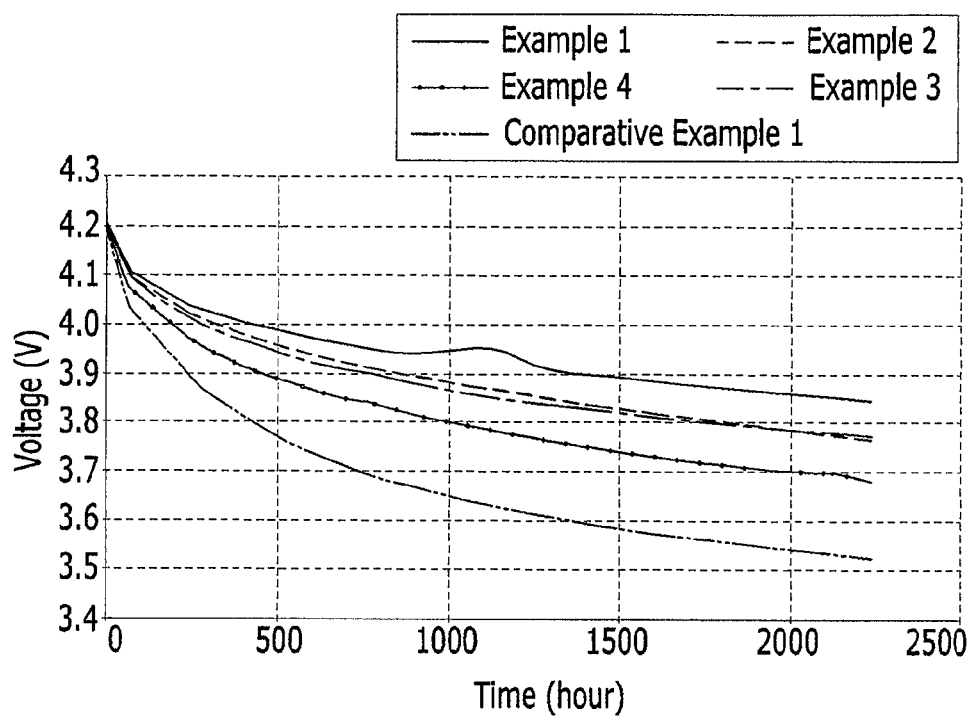
FIG. 8 is a graph showing self-discharge characteristics of the rechargeable lithium battery cells according to Examples 1 to 4 and Comparative Example 1.

FIG. 8 is a graph showing self-discharge characteristics of the rechargeable lithium battery cells according to Examples 1 to 4 and Comparative Example 1. A rechargeable lithium battery cell tends to be self-discharged as time passes and have a declining voltage. When the extent of decline of the voltage is great, it means that the self-discharge characteristics are poor. In FIG. 8, the vertical axis denotes voltage variation according to time.

Generally, when a rechargeable lithium battery cell has excellent high input and output characteristics, self-discharge rate increases. It may be seen from FIG. 8, the decrement of voltage (slope in graph) was great in Comparative Example 1 as time passed, and the voltage was relatively as low as about 3.55V in 2000 hours. This means that the self-discharge rate was high. In other words, the high input and output characteristics and impedance characteristics were excellent but the self-discharge rate was high in Comparative Example 1, and therefore the self-discharge characteristics were not excellent.

On the other hand, in case of Examples 1 to 4, the decrement of voltage according to time was small compared with that of Comparative Example 1, and the voltage in 2000 hours was relatively high. Therefore, since the self-discharge rate was low, it may be seen that the self-discharge characteristics were excellent.

Evaluation 4: Cycle-Life Characteristics

Figure 9:
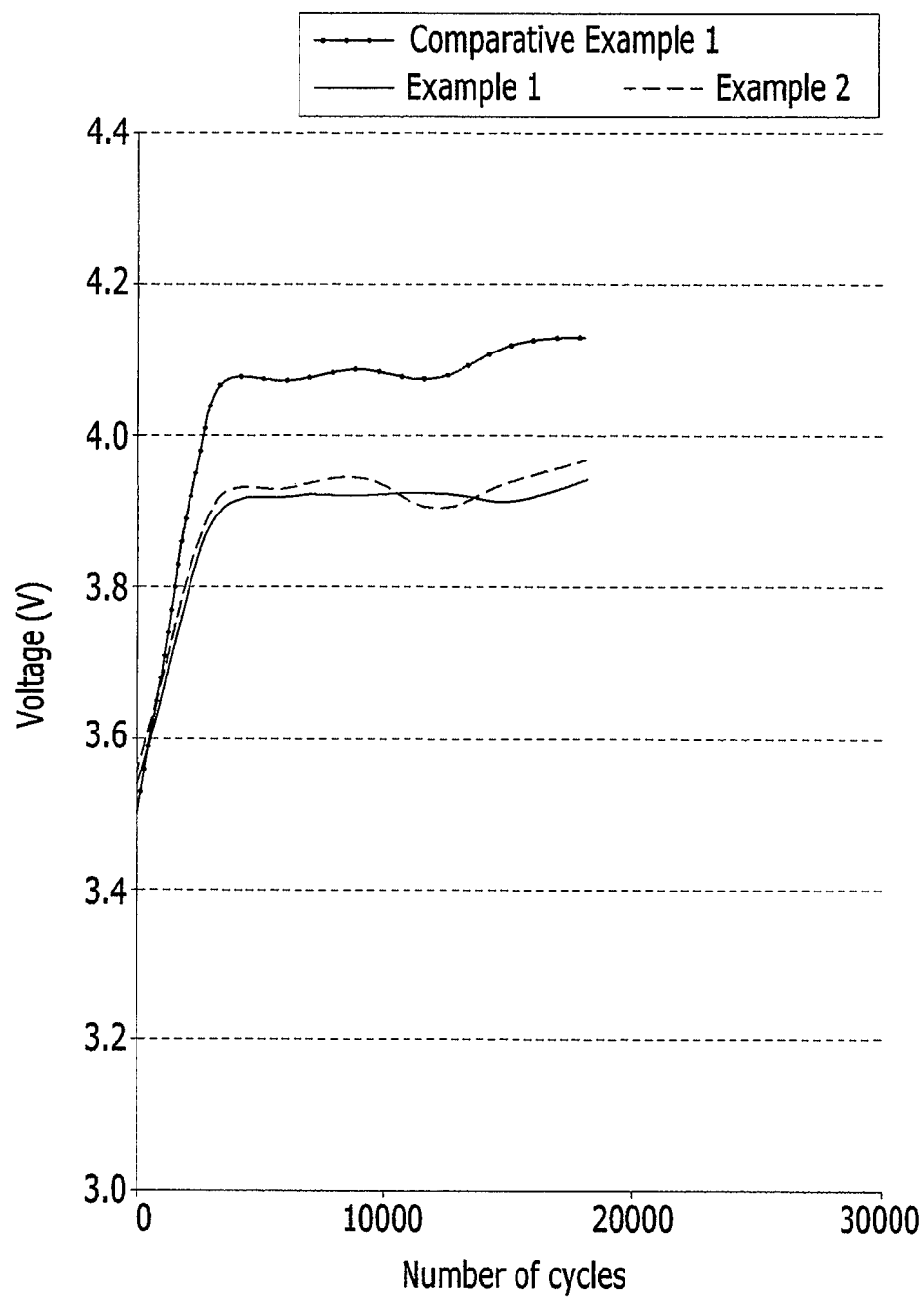
FIG. 9 is a graph showing cycle-life characteristics of the rechargeable lithium battery cells according to Examples 1 and 2, and Comparative Example 1.

FIG. 9 is a graph showing cycle-life characteristics of the rechargeable lithium battery cells according to Examples 1 and 2, and Comparative Example 1. When a rechargeable lithium battery cell goes through repeated charge and discharge to be degraded, voltage tends to increase. The vertical axis of FIG. 9 denotes voltage variation according to the increasing number of charge and discharge cycles. When the voltage was about 4.2V in FIG. 9, the rechargeable lithium battery cell is generally regarded that it has completed its cycle-life. As the increment of voltage according to the cycle number becomes greater, it means that the cycle-life characteristics are poorer.

Referring to FIG. 9, in case of Comparative Example 1, the voltage increment (slope in graph) according to the increasing number of charge and discharge cycles is great, the voltage was relatively as high as about 4.1V at 10,000≤cycle number. On the other hand, in case of Examples 1 and 2, the voltage increment according to the increasing number of charge and discharge cycles was small, and the voltage at 10,000 cycle number was relatively low. In short, it may be seen that the cycle-life characteristics of Examples 1 and 2 were superior to the cycle-life characteristics of Comparative Example 1.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof. Therefore, the aforementioned embodiments should be understood to be exemplary but not limiting this disclosure in any way.

What is claimed is:

1. A negative electrode composition for a rechargeable lithium battery, the negative electrode composition comprising:
   a negative active material and a crystalline carbon conductive material,
   wherein:
     the negative active material comprises soft carbon, the soft carbon has a (500) peak at 2θ of about 25°, a (8700) peak at 2θ of about 43°, a (7100) peak at 2θ of about 50° and a (1300) peak at 2θ of about 74° in X-ray diffraction (XRD) analysis; and
     the crystalline carbon conductive material comprises graphite having an average particle diameter (D90) of about 1 micrometer to about 20 micrometers.

2. The negative electrode composition of claim 1, wherein the crystalline carbon conductive material is included in an amount of about 0.5 wt % to about 45.5 wt % based on the total amount of the negative electrode composition.

3. The negative electrode composition of claim 1, wherein the crystalline carbon conductive material is included in an amount of about 0.5 wt % to about 25 wt % based on the total amount of the negative electrode composition.

4. The negative electrode composition of claim 1, wherein the crystalline carbon conductive material is an anisometric flake material.

5. The negative electrode composition of claim 1, wherein the crystalline carbon conductive material has a scott density of less than or equal to about 0.2 g/cm$^3$.

6. The negative electrode composition of claim 1, wherein the crystalline carbon conductive material has a specific surface area of about 5 to about 30m$^2$/g.

7. The negative electrode composition of claim 1, wherein the crystalline carbon conductive material has a dibutylphthalate (DBP) absorption of about 100 to about 300 g/100g.

8. The negative electrode composition of claim 1, wherein the crystalline carbon conductive material comprises ash in an amount of less than or equal to about 0.1 wt % based on the total amount of the crystalline carbon conductive material.

9. The negative electrode composition of claim 1, wherein the crystalline carbon conductive material further comprises carbon black.

10. The negative electrode composition of claim 1, wherein the crystalline carbon conductive material has a (14700) peak at 2θ of about 26° in X-ray diffraction (XRD) analysis.

11. The negative electrode composition of claim 1, further comprising a binder.

12. The negative electrode composition of claim 11, wherein the binder is selected from carboxylmethylcellulose, hydroxyethylcellulose, hydroxypropylcellulose, hydroxypropylmethylcellulose, polyvinylidene fluoride, polytetrafluoroethylene, polyethylene, polypropylene, a styrene-butadiene rubber, a polybutadiene, a butyl rubber, a fluorine rubber, polyethyleneoxide, polyvinylalcohol, poly(metha)acrylic acid and a salt thereof, polyvinylpyrrolidone, polyepichlorohydrin, polyphosphazene, polyacrylonitrile, polystyrene, polyvinylpyridine, chlorosulfonated polyethylene, a latex, a polyester resin, an acrylic resin, a phenolic resin, an epoxy resin, a polymer of propylene and C2 to C8 olefin, a copolymer of (meth)acrylic acid and (meth)acrylic acid alkyl ester, and combinations thereof.

13. A negative electrode for a rechargeable lithium battery, the negative electrode comprising:
a current collector, and
the negative electrode composition on the current collector according to claim 1.

14. A rechargeable lithium battery, the rechargeable battery comprising:
the negative electrode according to claim 13;
a positive electrode comprising a positive active material;
a separator between the positive electrode and the negative electrode; and
an electrolyte.

15. The rechargeable lithium battery of claim 14, wherein the positive active material comprises at least one selected from a lithium cobalt-based oxide, a lithium nickel cobalt manganese-based oxide, a lithium nickel cobalt aluminum-based oxide, and an olivine-based oxide.

16. The rechargeable lithium battery of claim 15, wherein the positive active material further comprises activated carbon.

17. The rechargeable lithium battery of claim 16, wherein the activated carbon is included in an amount of about 0.5 wt % to about 50 wt % based on the total amount of the positive active material.

18. The rechargeable lithium battery of claim 14, wherein the positive electrode further comprises a conductive material.

19. The rechargeable lithium battery of claim 18, wherein the conductive material comprises at least one selected from natural graphite, artificial graphite, carbon black, acetylene black, ketjen black, a carbon fiber, a carbon nanotube, a metal powder, a metal fiber, and a conductive polymer.

20. The rechargeable lithium battery of claim 14, wherein the rechargeable lithium battery is configured as a battery for ISG (integrated starter generator).

\* \* \* \* \*